UNITED STATES PATENT OFFICE.

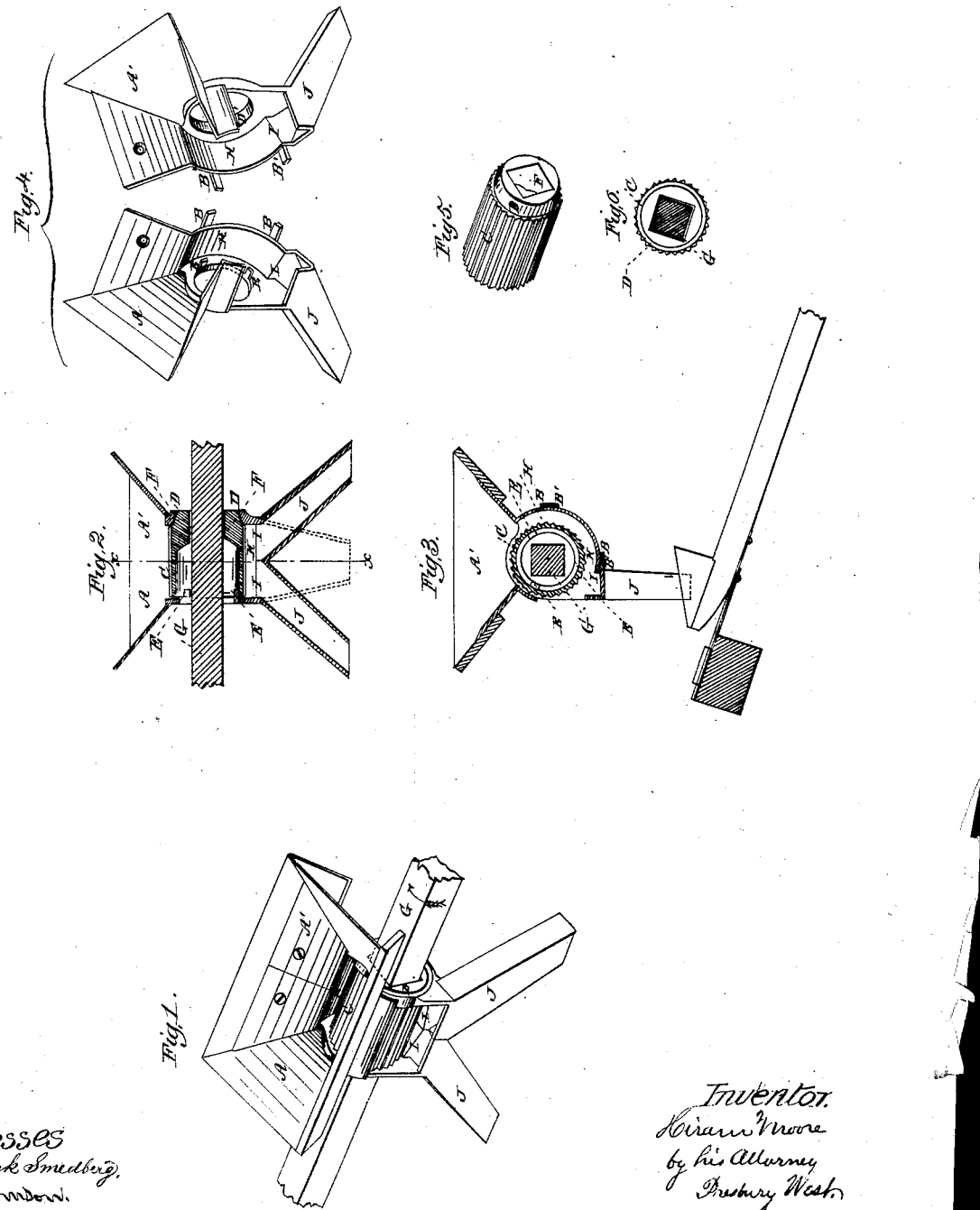

HIRAM MOORE, OF BRANDON, WISCONSIN.

IMPROVEMENT IN SEED-DRILLS.

Specification forming part of Letters Patent No. 30,685, dated November 20, 1860.

*To all whom it may concern:*

Be it known that I, HIRAM MOORE, of Brandon, in the county of Fond du Lac and State of Wisconsin, have invented certain new and useful Improvements in Seeding-Machines, of which the following is a full, clear, and exact description, reference being had to the accompanying drawings making part of this specification, in which—

Figure 1 represents a perspective view of so much of a seeding-machine as is necessary to illustrate my said improvements. Fig. 2 represents a longitudinal section through the center of the distributing-cylinder. Fig. 3 represents a transverse section at the line $x\ x$ of 2. Fig. 4 represents a perspective view of the two parts of the hopper detached and with the distributing-cylinder removed, showing the construction of the hopper. Fig. 5 represents a perspective view of the toothed distributing-cylinder, detached from the hopper; and Fig. 6 represents an end view of the cylinder, with the driving-shaft shown in section.

The object of my said improvements is the more evenly and equally to distribute the grain or seed to be sowed, and to render the machine more simple and less liable to get out of order; and they relate particularly to that class of seeding-machines in which a toothed distributing-cylinder is used at the bottom of a seed box or hopper in order to distribute the grain or seed. They consist, first, in combining a conduit or passage for the grain, arranged between the bottom of the hopper and the discharging-orifice, with the oblique discharging-orifice and the distributing-cylinder; second, in combining separate bearings for the cylinders with a single bearing in the cylinder for the shaft, in the manner hereinafter described.

By this means we attain important advantages. The warping or twisting of the seed-box is a fruitful source of trouble in machines of this class, for the hopper being rigidly fastened at the bottom of the seed-box, any warping or twisting of the latter will cause the hopper to change its position relative to the shaft, and if the cylinder be firmly fastened upon its shaft it will bind against the sides of the hopper, and in its bearings producing much friction and increasing the draft of the machine and its liability to get out of order. By having the shaft-bearing in the cylinder larger than the shaft and short, the evil effects of a displacement of the cylinder will be obviated in great measure, as the axis of the cylinder need not be coincident or even parallel with the axis of the shaft, but may vary considerably from it without the cylinder binding upon the shaft, and the cylinder will still be controlled by the revolution of the shaft, the cylinder being retained in place within the hopper by its own independent bearings.

I am aware that distributing-cylinders have before this been placed loosely upon shafts at the bottom of hoppers, but without separate bearings, so that they cannot retain their proper relative position within and to the hoppers, and consequently the flow of seed or grain is irregular and uneven.

Third, in giving to the cylinder a beveled bearing, the bevel inclining outward from the hopper, as shown in the drawings. By this arrangement I attain a very important advantage. Refuse, such as small pieces of straw, dirt, &c., which may be mixed with the grain and thrown into the hopper, is very apt to become worked into and remain in bearings as usually constructed, thus greatly impeding the revolutions of the cylinder, causing friction in the bearings, and increasing the draft of the machine. By using a bevel-bearing, however, as shown, any dirt, &c., that may get into the bearing does not tend to remain, but is almost immediately worked out by gravitation and the revolving action of the cylinder in its bearings, and falls below the cylinder, and is discharged with the seed.

As my improvements only relate to the distributing apparatus of a seeding-machine, I deem it unnecessary to describe the other portions of the machine.

In the drawings, A A' represent the lower portion of a hopper of a seeding-machine. It may be made of brass or other suitable material, and a number of them may be arranged at the bottom of a seed-box, and attached to the frame of the machine in any usual or convenient way. This hopper I make in two sections, as shown in Fig. 4 of the the drawings, in order the more easily and readily to remove and replace the cylinder, and to enable the hopper to be constructed with more facility. These sections are retained in position, when placed together, by ribs or tongues B B', arranged substantially as shown, which interlock and prevent any twisting apart of the sections. C represents the toothed distributing-cylinder, retained in its position within the cylinder by its independent bearings, consisting of the bevel-bearing D at one end and the bosses E E at the other. These bosses project from the inside of the hopper, and the inner edge of the cylinder encircles and rests upon and revolves around them. The cylinder is made of a peculiar form, as shown, the narrow bearing F for the driving-shaft G being formed within it, and the rest of the cylinder being hollowed out to make it lighter, and to allow of its having more lateral play upon the shaft. This narrow bearing F is made larger than the shaft, to allow the latter to pass loosely through the cylinder, and thus it will be seen that hopper and cylinder can alter their position considerably with respect to the shaft, and still the cylinder will be controlled by the revolutions of the shaft and not bind upon it. H represents the conduit or passage for the grain or seed. It is arranged around the cylinder C, as shown, and as the cylinder revolves its teeth move the grain through the conduit to the oblique discharging-orifice I I. This conduit H passes beyond the lowest point of the cylinder, and then curves or inclines slightly upward, so that the grain cannot fall out from the conduit by gravitation, but must be moved, as it were, up hill before it can reach the discharging-orifice I I, and be delivered into the duct J J. As shown in the drawings, the grain is discharged first at the ends of the orifice, and last at the middle, an equal and regular supply being delivered upon each side of the middle of the cylinder.

The discharging-orifice may have a double oblique face, as shown in the drawings, forming an angle at the middle, or it may be a single face, oblique to the face of the cylinder-teeth. From the orifice the forked duct J J receives the grain and delivers it to colter-legs, by which it is deposited in the earth. Thus a single hopper and cylinder may be used to supply grain or seed to each pair of colters, whereby but half the number of hoppers and cylinders become necessary. If preferred, however, a single duct may be used, in which case it becomes neccessary to have a hopper and cylinder to each colter. A side view of a colter, showing its position with respect to the hopper, cylinder, and duct, is shown in Fig. 3.

In sowing broadcast, the colters are to be dispensed with.

I am aware that forked ducts have, before this, been used to convey the grain from the hopper and seed-cylinder, and I, therefore, make no claim to the forked duct alone as of my invention.

The shaft G, passing loosely through all the cylinders, may be driven by gearing from the driving-wheel, or in any suitable or convenient way.

Having thus described the construction and operation of my improved distributing apparatus, what I claim therein as new, and desire to secure by Letters Patent, is—

1. The conduit or passage H, arranged between the bottom of the hopper and the discharge, in combination with the oblique discharge I and the toothed distributing-cylinder C, substantially as described, and for the purposes herein specified.

2. The combination of separate bearings of the cylinder with a single shaft-bearing in the cylinder, shorter than the cylinder and larger than the shaft, in the manner and for the purposes substantially as herein specified.

3. A distributing-cylinder for seeding-machines having a beveled bearing, substantially in the manner and for the purposes herein specified.

In testimony whereof I have hereunto subscribed my name.

HIRAM MOORE.

Witnesses:
JOSEPH H. POST,
R. C. KELLY.